United States Patent

[11] 3,627,088

[72] Inventor John T. Muller
Box 296, Hanover, N.J. 07936
[21] Appl. No. 49,341
[22] Filed June 24, 1970
[45] Patented Dec. 14, 1971
Original application Apr. 15, 1968, Ser. No. 721,301, now Patent No. 3,552,390, dated Jan. 5, 1971. Divided and this application June 24, 1970, Ser. No. 49,341

[54] DRIVE RELEASE AND REPOSITIONING MEANS FOR A RECIPROCATING MEMBER
5 Claims, 11 Drawing Figs.

[52] U.S. Cl..................................................... 192/142 R,
192/143, 318/467
[51] Int. Cl..................................................... F16d 71/02

[50] Field of Search............................................ 192/142 R,
142 A, 143, 146, 148, 149; 318/467

[56] References Cited
UNITED STATES PATENTS
3,120,298  2/1964  Rossi............................. 192/142 R
3,157,261  11/1964  Bono............................. 192/146 X
3,399,751  9/1968  Hakata......................... 192/142 R Primary Examiner—Allan D. Hermann
Attorney—Miketta, Glenny, Poms and Smith ABSTRACT: Cardiopulmonary resuscitating apparatus for automatically providing constant, substantial rhythmic heart perfusion at a rate equal to a normal heart beat and timed ventilation of the patient's lungs to provide artificial ventilation and circulation during cardiac arrest.

Patented Dec. 14, 1971

INVENTOR.
JOHN T. MULLER
By
Miketta, Glenny, Poms & Smith
ATTORNEYS.

Patented Dec. 14, 1971

INVENTOR
JOHN T. MULLER
BY
Miketta, Glenny, Poms & Smith
ATTORNEYS.

INVENTOR.
JOHN T. MULLER
By
Miketta, Glenny, Poms & Smith
ATTORNEYS.

Patented Dec. 14, 1971

INVENTOR.
JOHN T. MULLER
By
Miketta, Glenny, Poms & Smith
ATTORNEYS.

DRIVE RELEASE AND REPOSITIONING MEANS FOR A RECIPROCATING MEMBER

This is a division of application, Ser. No. 721,301, filed Apr. 15, 1968, now U.S. Pat. No. 3,552,390 issued Jan. 5, 1971.

BACKGROUND AND SUMMARY OF THE INVENTION

It is well known that upon cardiac arrest, a patient's body organs and tissues remain alive for several minutes but that the blood is not receiving oxygen nor is the blood being circulated. Within a short time after the heart stops, this lack of circulation and oxygen will cause irreversible organic body damage. It has therefore been known that artificial respiration, such as mouth-to-mouth ventilation or ventilation by some mechanical means, and concurrent artificial cardiac compression, may temporarily provide the lung and heart functions to prevent damage to the body. In some cases, where cardiac arrest involves only standstill and not fibrillation, it has been found that cardiopulmonary resuscitation may induce spontaneous recovery of the heart.

One medical technique for providing cardiac resuscitation is open-chest heart massage. However, it is apparent that not only does application of this technique require a skilled medical practitioner to perform the thoracotomy, but it can be performed only in the proper environment with suitable equipment. Moreover, open-heart massage will ordinarily be limited by the critical time period in which circulation must be commenced and the physical requirement of continuous tiring hand massage. Consequently, external or closed-chest cardiac resuscitation has been proven to be a valuable life saving technique which can be applied in emergency situations by a mechanical apparatus.

In the development of the external cardiac resuscitation technique, it has been found and reported by the American Heart Association, that effective heart pumping pressure can be maintained by applying an external pressure over the lower one-third of the sternum, depressing it approximately 1¾ inches. Specifically, it is recommended that the depression of the sternum to provide efficacious circulation, without physiological patient damage must be within a range of 1½ to 2 inches.

Prior art devices are known which provide external compression of the heart, and in general, these devices operate by driving a compression or power rod through either a spring or fluid transmission means. In such apparatus, the compression rod is provided with a pressure foot pad which engages the patient, but the stroke of the compression rod is variable, as determined by the spring or fluid pressure, and must be monitored and controlled by a skilled person during operation. Furthermore, such devices have been large in size and cumbersome in use so as to restrict their practical application to hospitals and other institutions which can accommodate such devices. The devices, requiring a constant monitoring and adjustment of the spring or fluid pressure so as to provide the correct compression stroke, also require constant maintenance and surveillance by skilled personnel. This limits such devices not only to a particular environment, but also restricts the use of such apparatus because of the limited number of skilled personnel who are capable of operating the machine.

One example of prior art resuscitators is shown and described in Rand et al. U.S. Pat. No. 3,254,645, issued June 7, 1966. In this device, the power means for driving a reciprocating cardiac compression rod or beam is connected to the rod through spring means, and the spring pressure may be adjusted manually. The adjusted spring pressure is shown by an indicating device which may be monitored by the operator so that the spring pressure does not become sufficient to be injurious to the patient's body. It will be readily appreciated that, as indicated above, this device requires a skilled operator and constant monitoring of the operation of the device, and it produces variable stroke which is controlled by the operator in accordance with the pressure. It is also noted that the stroke length will vary to an appreciable extent depending upon the physical condition of the patient. For example, a patient suffering from emphysema is likely to exhibit substantially increased resistance to sternum compression. Downward force of a certain amount on such a patient will then produce a smaller distance of movement than otherwise, resulting in inadequate perfusion in such cases.

Accordingly, it is the general object of the present invention to provide a novel cardiopulmonary resuscitating apparatus constituting a substantial improvement over prior art devices and which avoids the foregoing disadvantages of similar types of cardiopulmonary resuscitating apparatus used heretofore.

It is an object of the present invention to provide a closed-chest cardiac resuscitation apparatus which in operation on a patient with heart arrest will automatically, rhythmically depress the sternum a fixed positive distance to effect optimum heart perfusion without injury to the patient and without the need of continual monitoring and control by a skilled operator.

Another object of the present invention is to provide a cardiac resuscitation apparatus which is completely portable, easily set up for use and positionable in relation to a supine patient suffering from heart arrest so as to provide rhythmic external heart massage by depressing the patient's body proximate the heart a distant no less than 1½ inches and no more than 2 inches so as to assure effective blood circulation.

Still another object of the present invention is to provide a cardiac resuscitation apparatus which has a predetermined cardiac compression stroke range between critical distances with no more than single initial adjustment of a compressor rod or beam dependent only upon the patient's depth of chest and needing no further adjustment during operation, so as to minimize the skill required and the attendance necessary during operation of the apparatus.

It is a further object of the present invention to provide a cardiac resuscitation apparatus which has a positive mechanical connection between a pressure foot pad bearing upon the patient's sternum and an electric drive motor during a predetermined portion of the compression stroke, assuring effective heart perfusion without body injury, the total stroke length depending in only a minor degree upon the patient's body condition.

A still further object of the present invention is to provide a cardiac resuscitation apparatus comprising a reciprocating member having compression and release strokes, driven by a undirectional motor and interconnecting means adapted to disconnect the motor from the reciprocating member at a predetermined point in the downstroke of the reciprocating member, and in which the upward movement of the member on the release stroke is retarded by applying a minor proportion of motor power through the interconnecting means to the reciprocating member.

Yet another object of the present invention is to provide a cardiac resuscitation apparatus having a motor and reciprocating compression member interconnected by clutch means which clutch is actuated at a predetermined point in the downstroke of the compression member to partially disengage the clutch so as to control a portion of the stroke length by providing partial driving connection resisted by the patient's body.

One more object of the present invention is to provide a cardiopulmonary resuscitation apparatus including the cardiac resuscitation apparatus of the above-described type in combination with respiration means and including means for synchronously timing the respiration cycle with the cardiac compression cycle so as to provide lung ventilation commensurate with the heart resuscitation.

In general, the present invention provides a cardiac resuscitation apparatus for use on a patient with cardiac arrest in which a reciprocating compression beam is driven downwardly by power means through interconnecting means and is disconnected at a predetermined point in the downstroke of the compression rod and is moved upwardly by the force of the patient's body without power. This provides a compression stroke of a predetermined minimum fixed length sufficient to produce effective heart perfusion and protection against body damage by allowing the lower extremity of the stroke to be responsive to the patient's body condition. The invention further contemplates coordinated artificial respiration with cardiac compression so as to provide periodic regulated synchronous lung ventilation.

Detailed Description

Figure 1:
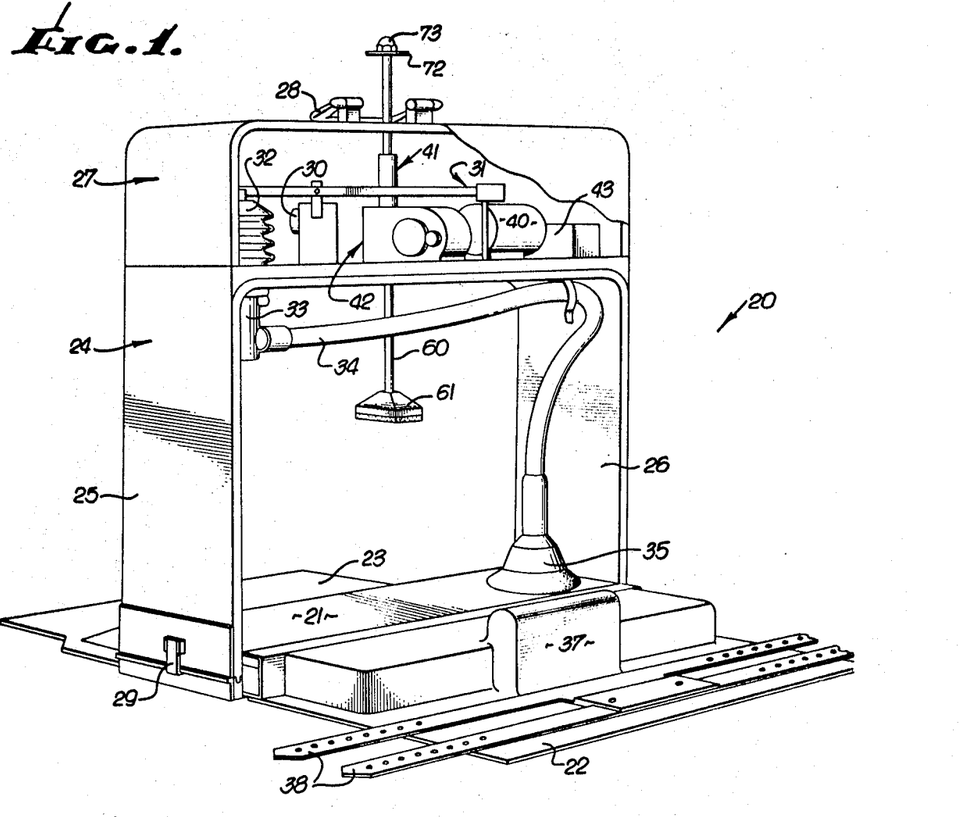
FIG. 1 is a perspective view of an exemplary embodiment of a cardiopulmonary apparatus, shown in position for use, constructed in accordance with the present invention.
Figure 2:
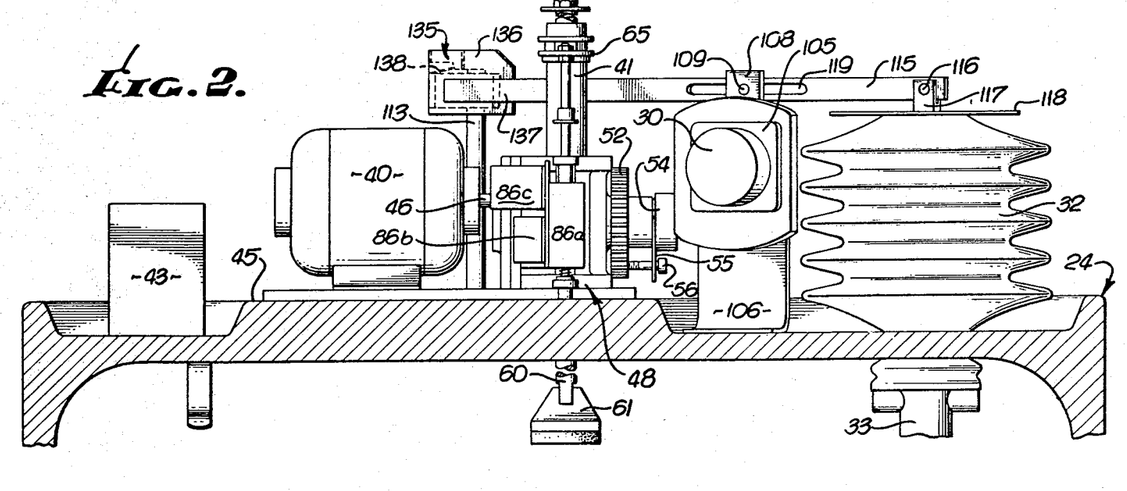
FIG. 2 is a front elevation view of a portion of the apparatus shown in FIG. 1.
Figure 3:
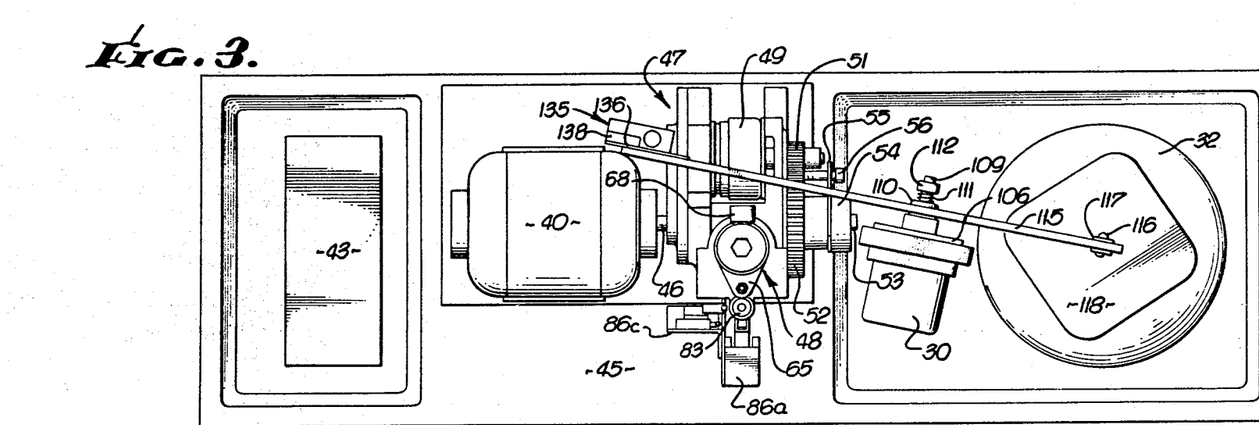
FIG. 3 is a top plan view of the portion of the apparatus shown in FIG. 2.

Referring now to FIG. 1, there is shown an exemplary apparatus 20 which is completely portable. Apparatus 20 comprises a case having a bottom wall 21 and hinged front and rear wall sections 22 and 23, respectively. The case also includes a frame indicated generally at 24 having end walls 25 and 26 and an upper case housing 27 containing the working elements of the cardiopulmonary apparatus. The upper wall of the case housing has attached thereto a carrying handle 28. Since the entire apparatus weights less than 20 pounds, the case in its folded condition may be easily carried using carrying handle 28.

The frame 24 is attached to base 21 by means of latching clips, one of which is shown at 29, so that the frame may be detached from the assembly including the base and front and rear wall sections, thus permitting the assembly to be easily slid beneath a supine patient. The frame may then be subsequently reattached to the base by means of clips 29 so that the apparatus is properly positioned with respect to the patient.

The cardiopulmonary apparatus generally comprises an artificial respiration assembly including a respirator drive motor 30, an actuating arm assembly indicated generally at 31, and air bellows 32. Air bellows 32 has a conventional air intake and an air outlet 33 connected to a flexible hose or tube 34 having a face mask 35 attached to the free end thereof. Bellows outlet 33 may have a pressure relief valve (not shown) disposed therein so as to prevent the forced air from causing stomach distension of the patient.

With continued reference to FIG. 1, the cardiopulmonary apparatus 20 also includes a cardiac resuscitation assembly including a drive motor 40, a reciprocable compression member, rod or beam 41, means 42 interconnecting the drive motor and compression member and a control circuit disposed in circuit box 43.

In use, the front and rear sections 22, 23 are unfolded and a patient is arranged so that his neck is positioned over a neck rest 37 to produce full head tilt so as to assure opening of the patient's breathing airway. Moreover, there are provided on front section 22 of the case, straps 38 for securing mask 35 over the mouth of the patient to prevent leakage of the forced air supplied during respiration.

For a complete description of the portable case comprising a part of the cardiopulmonary apparatus, attention is drawn to the copending application Ser. No. 549,847 now, U.S. Pat. No. 3,461,858 issued Aug. 19, 1969, assigned to the same assignee as is the present application.

CARDIAC RESUSCITATION APPARATUS

For a more detailed description of the cardiac resuscitation apparatus reference is now made to FIGS. 2 through 7. As seen best in FIGS. 2 and 3, and with particular attention to the mechanical elements of the cardiac resuscitation apparatus, it is seen that the drive motor 40 is mounted on base 45 of the case frame 24. Cardiac drive motor 40 has an output shaft 46 connected to a gear reducer shown at 47 for reducing the speed of the motor 40 in a manner well known in the art. Gear reducer 47 is mounted on a housing 48 which in turn is supported by base 45 of the case frame 24. The output of gear reducer 47 is connected to a magnetic clutch at 49 for connecting the drive motor with the reciprocable compression beam. The magnetic clutch may, for example, be of a type manufactured by Warner Electric Brake & Clutch Co. of Beloit, Wisconsin.

Figures 4, 7:
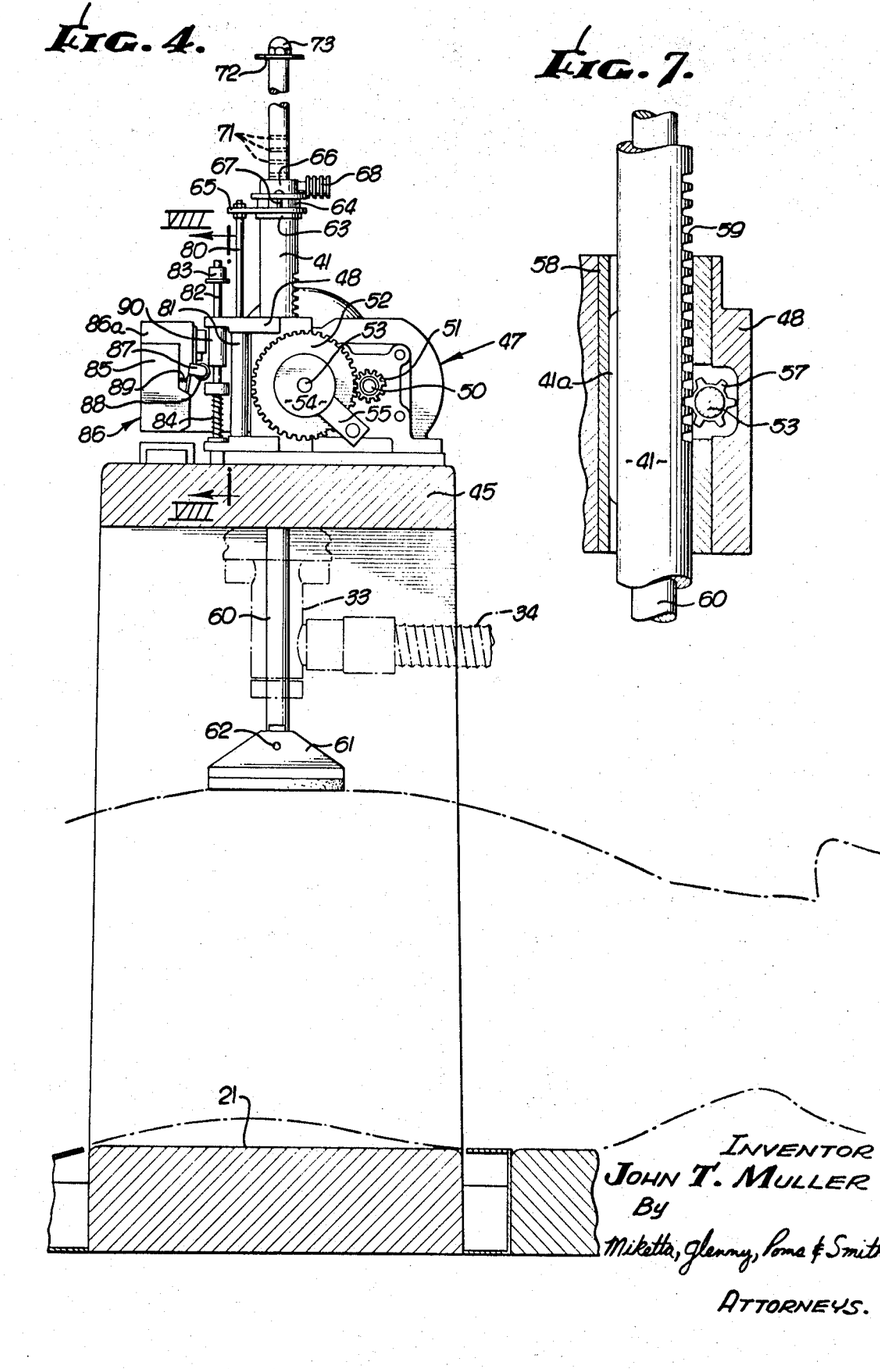
FIG. 4 is a side elevation sectional view of a portion of the apparatus with the torso of a patient shown in dotted outline.
FIG. 7 is a fragmentary sectional view of a portion of the apparatus taken along the line VII—VII of FIG. 5.
Figures 5, 8:
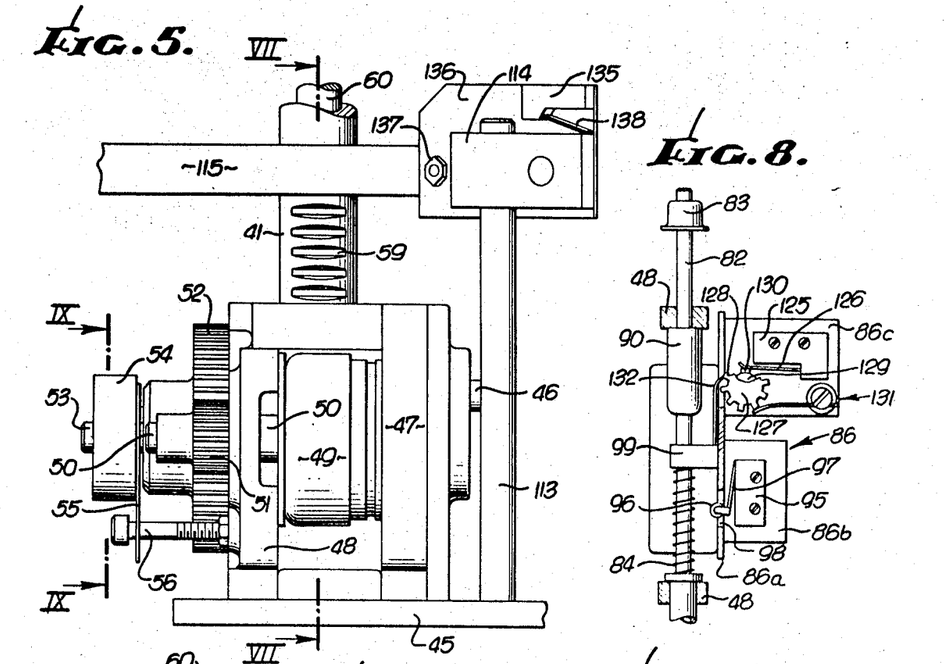
FIG. 5 is a fragmentary rear elevation view of a portion of the apparatus.
FIG. 8 is a fragmentary sectional view taken along the lines VIII—VIII of FIG. 4.
Figure 9:
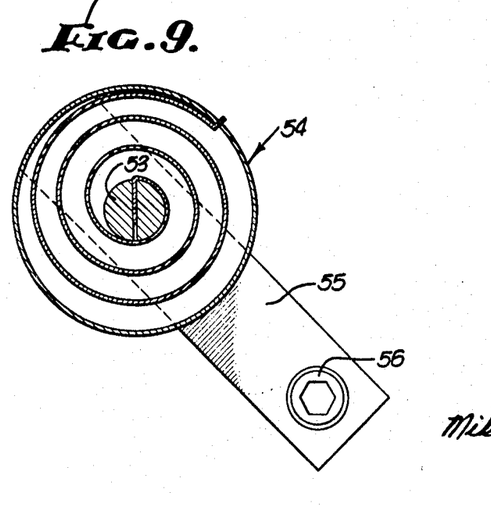
FIG. 9 is a fragmentary sectional view of resilient means, taken along the line IX—IX of FIG. 5.

The output shaft 50 of magnetic clutch 49 is connected to further gear reducing means comprising a first gear 51 mounted on shaft 50 which is rotatably supported in housing 48 and a second gear 52 mounted on a second shaft 53 as seen best in FIGS. 4 and 5. On the free end of shaft 53 is mounted a spiral spring 54 having a tension adjustment arm 55 and a retaining screw 56 as seen best in FIG. 9. Internally of housing 48, as seen best in FIG. 7, there is mounted a pinion gear 57 on shaft 53. Housing 48 is also provided with a vertical cylindrical opening having a cylindrical bearing 58 disposed therein for receiving the compression member 41 which is prevented from rotation by key 41a. The compression member or beam 41 supports a gear rack such as at 59, machined in the rod itself, it being understood that the gear rack must be fixedly mounted on but not necessarily integral with the compression member 41. Pinion gear 57 engages rack gear 59 for reciprocably driving the compression beam 41.

In the exemplary embodiment of this invention, compression beam 41 has a cylindrical opening therein for telescopically receiving a bar 60 having a bifurcated lower end for pivotally supporting a pressure foot pad 61 through a pivot pin 62. The upper end of compression beam 41 includes a collar 63 and a nut 64 threadedly engaging the upper end of the beam 41 so as to secure a trip arm 65 thereon. A second collar 66 is disposed above nut 64 fixedly mounted on the upper end of beam 41 through fasteners 67, as seen best in FIG. 6, and includes lateral openings for receiving an adjustment pin 68 Pin 68 is releasably attached to collar 66 by means of a flexible retaining element 69 surrounding collar 66 and received in a notch 70 of adjustment pin 68. Bar 60 extends above the upper end of compression beam 41 and includes a plurality of laterally disposed adjustment holes 71 and an upper retaining element 72 secured by threaded nut 73 for preventing the rod from passing completely through the compression beam 41 when adjustment pin 68 is removed. Patients having a chest depth of various sizes may thus be accommodated by the apparatus through the above-described adjustability means.

Figure 6:
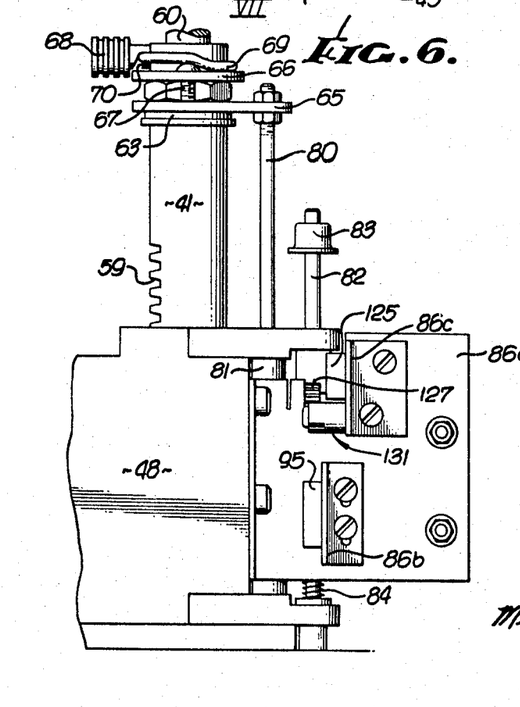
FIG. 6 is a fragmentary side elevation view of a portion of the apparatus looking in the direction opposite to that of FIG. 4.

Means are provided in accordance with the present invention for controlling the clutch connection between the reciprocable compression member 41 and the cardiac drive motor 40. Referring to FIGS. 4, 6 and 8, the trip arm 65 is secured against rotational movement with respect to the compression beam 41 by means of a pin 80 secured at its upper end to trip arm 65 and slidably received in a cylinder 81 fixed to housing 48. Disposed laterally adjacent to slidable pin 80 is a plunger rod 82 slidably received in housing 48 and having a cap 83 attached to the upper end thereof and abuttable by trip arm 65 as compression beam 41 moves downwardly. Plunger rod 82 is resiliently biased upwardly by spring 84. Mounted laterally adjacent to plunger rod 82, as seen best in FIG. 4, is a normally closed electrical contact switch 85 secured to a support plate 86 and more specifically to portion 86a thereof. Contact switch 85 has a pivotally mounted contact support arm 87 on which is rotatably mounted a contact wheel 88. Contact wheel support arm 87 is normally biased outwardly by means of spring 89. A switch actuating member 90 in the form of a cylinder is fixedly attached to plunger rod 82 so that upon reciprocation of plunger rod 82 electrical contact switch 85 will be alternately opened and closed. Contact switch 85 constitutes a first means for controlling the voltage impressed upon magnetic clutch 49 in a manner, and for reasons, to be explained more fully hereinafter.

A second contact switch 95 is also mounted on a second portion 86b of support plate 86, as seen best in FIG. 8. Contact switch 95 is mounted in a plane normal to that of switch 85. Switch 95 includes a contact roller 96 rotatably supported on the free end of a resiliently biased arm 97. Contact roller 96 normally extends through an opening 98 in portion 86a of support plate 86. An actuating member for contact switch 95, in the form of a rectangular cam 99 is mounted on plunger rod 82 below first cam actuating member 90 and will be seen to actuate switch 95 only upon a substantial downstroke of plunger rod 82. Switch 95 constitutes second means for controlling the clutch connection between cardiac drive motor 40 and reciprocable compression beam 41 in a manner, and for reasons, to be explained more fully hereinafter.

ARTIFICIAL RESPIRATION MEANS

As indicated above, the cardiopulmonary apparatus includes in combination with the cardiac resuscitation apparatus an artificial respiration means. Attention is directed particularly to FIGS. 2, 3, 5 and 10 for an illustration of mechanical elements of the artificial respiration means. The respiration means includes the drive motor 30 and a gear reducer 105 mounted on a bracket 106 supported on the base 45 of the case frame 24. The output shaft 107 of the gear reducer 105 has connected thereto a crank arm 108. On the free end of arm 108 is a slider pin 109 rotatably supporting a slider collar 110, a spring 111 and fixed collar 112.

Figure 10:
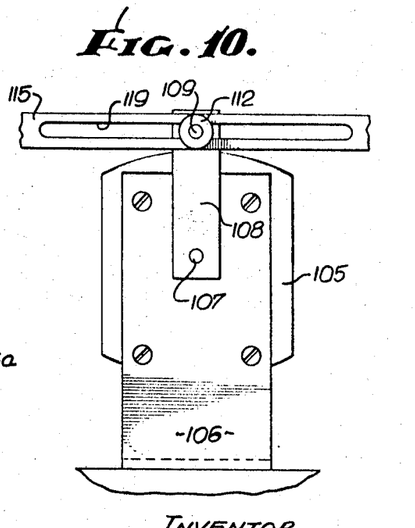
FIG. 10 is a fragmentary rear elevation view of a portion of the artificial respiration means forming a part of the apparatus.

The artificial respiration means also includes an actuating arm assembly including a standard 113 mounted on base 45 and having a head 114 at the upper end thereof. A actuating arm 115 is pivotally attached near one end to head 114 and adapted to pivot thereabout. The other end of actuating arm 115 is pivotally connected through a pin 116 to a bifurcated bracket 117 which is mounted on a plate 118 secured to air bellows 32. Disposed centrally in actuating arm 115 is a longitudinally extending slot 119 for receiving slider engagement collar 110. It will be readily seen that rotation of respirator drive motor 30 causing rotation of crank arm 108 will cause actuating arm 115 to reciprocate arcuately so as to extend and compress air bellows 32 creating a source of forced air supply for lung ventilation of the patient.

The respirator also includes means for coordinated, periodic cyclical operation with the reciprocating motion of the cardiac compression beam 41. The mechanical elements of the coordinating means includes an electrical contact switch 125, as seen best in FIG. 8, mounted on portion 86c of support plate 86 and vertically disposed above contact switch 95. Respirator motor switch 125 includes a resiliently biased contact arm 126. Mounted on support plate portion 86c is a ratchet wheel 127 including teeth 128 and a hub 129. Hub 129 supports two diametrically oppositely spaced contact tabs 130 for engagement with resiliently biased contact arm 126. Ratchet wheel 127 is prevented form free rotation by frictional biasing means indicated at 131.

The cam 99 mounted on plunger rod 82 supports an upstanding pawl 132 for indexing ratchet wheel 127 upon reciprocation of plunger rod 82. In the particular embodiment illustrated, ratchet wheel 127 is provided with 10 teeth, so that upon five reciprocal cycles of plunger rod 82 the contact projections 130 will engage switch arm 126 so as to close the normally open electrical switch 125.

Since switch 125 is only momentarily closed during continuous reciprocation of the compression beam, means are provided for causing the respirator to continue through a complete cycle of inspiration and expiration after switch 125 resumes its normally open condition. This is accomplished by providing a second normally open switch 135, paralleled with switch 125, together with means camming switch 135 into closed condition as long as the respirator is not at its rest position. More specifically, respirator actuating arm normally open contact switch 135 is mounted on a plate 136 secured to actuating arm 115 by fastener 137, as seen best in FIG. 5. Contact switch 135 includes a resiliently biased contact arm 138 so disposed that upon arcuate movement of actuating arm 115 due to the momentary operation of respirator motor 30 and therefore actuating arm 115, switch 135 will be closed so as to provide continuing current to motor 30 through one arcuate cycle of actuating arm 115.

CONTROL CIRCUIT

Figure 11:
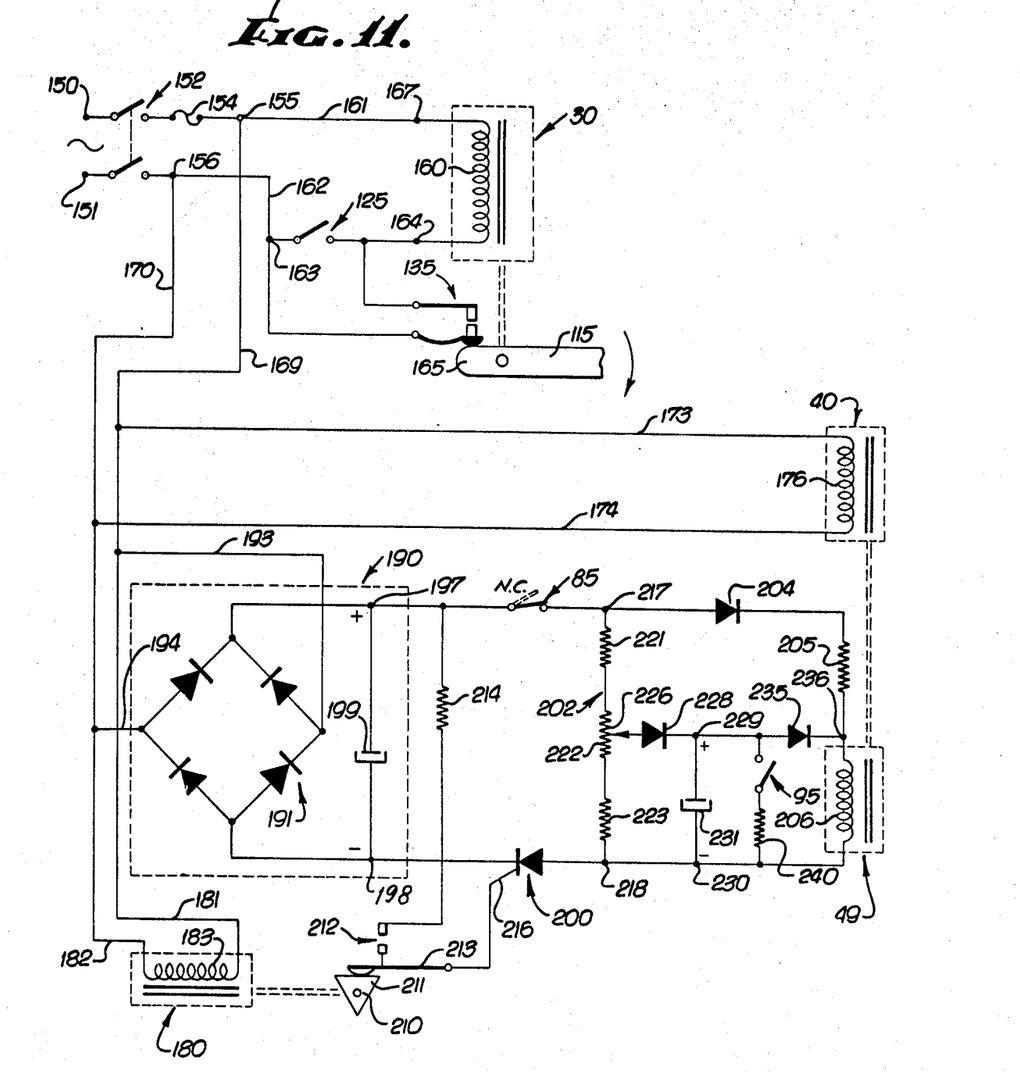
FIG. 11 is a circuit diagram embodied in the apparatus shown in conjunction with schematic illustrations of several mechanical portions of the apparatus.

The schematic diagram shown in FIG. 11 illustrates preferred circuitry for the practice of the present invention. Terminals 150 and 151 are adapted to be connected to an external source of alternating current power at, say, 115 volts. This power is fed through a conventional switch 152 and a fuse 154 to the supply terminals 155 and 156, for distribution therefrom to the several electrical components of the invention, namely respirator drive motor 30, cardiac drive motor 40, a timing motor and magnetic clutch 49.

In the upper portion of FIG. 11 there is provided the circuitry for driving the respirator drive motor previously referred to and indicated generally at 30, the motor including a winding 160 supplied with power from terminals 155, 156 through leads 161 and 162, under the control of switch means to be now described. The normally open switch 125 previously referred to is connected between point 163 of lead 162 and one end 164 of winding 160, and is paralleled by the second normally open switch 135 previously mentioned. Means are provided in conjunction with switch 135 for maintaining that switch closed during a slightly less than one complete cycle of the respirator motor. In the present schematic showing, such means include the actuating arm 115 having an end portion 165 adapted to close switch 135 immediately upon the commencement of arcuate movement of actuating arm 115 and serving to maintain such switch closed until a full cycle is completed. At that time end portion 165 permits the normally open switch 135 to return to its open position. Lead 161 is connected to the other end 167 of motor winding 160.

Power is also supplied form supply terminals 155, 156 through leads 169, 170 to the other mentioned electrical components of the present invention, including the cardiac drive motor, a timing motor and, through a full wave rectifier and control circuitry, to the magnetic clutch.

More specifically, the cardiac drive motor 40 is connected to the supply leads 169, 170 through conductors 173, 174, respectively, connected across the winding 176 of the cardiac drive motor.

A timing motor 180, preferably a synchronous motor, is mounted within control circuit box 43 previously indicated, and is supplied with power from leads 169, 170 through conductors 181, 182 across winding 183 of the timing motor. It will be noted that, so long as main switch 152 is closed, the windings 176 and 183 of the cardiac drive motor and of the timing motor, respectively, are continuously energized and these two motors are accordingly constantly rotating.

Means are provided in accordance with the present invention for controllably energizing the magnetic clutch 49, whereby to controllably apply rotational power from the cardiac drive motor 40 to the vertically reciprocating beam 41 during the perfusion operation of the invention.

In the lower portion of FIG. 11 there is shown a preferred form of circuitry for cyclically applying selected voltages to the magnetic clutch 49, and thereby to determine the amount of downwardly directed force applied to the beam 41. A DC power supply is indicated generally at 190 and includes a full wave rectifier indicated generally at 191 of conventional construction fed by lines 193 and 194 from lines 169, 170 respectively, and providing a DC output at terminals 197 and 198, with a capacitor 199 between the terminals in order to minimize ripple in the output, in accordance with conventional practice. The DC output from terminals 197, 198 is fed through a normally closed switch 85 previously referred to in connection with FIG. 4, and through gating means such as a silicon-controlled rectifier indicated generally at 200. The DC output thus controlled is impressed across a voltage dividing network indicated generally at 202, and also, through diode 204 and resistor 205, across the winding 206 of the magnetic clutch 49.

With particular reference to the gated rectifier 200 and its energizing circuit, it will be seen that the timing motor 180 drives a rotatable cam 210 having lobes 211, there being three lobes in the present illustrative embodiment of the invention. The normally open switch indicated generally at 212 includes a follower 213 contacting the cam 210 and its lobes 211, so that switch 212 is momentarily closed cyclically during rotation of cam 210. Closure of switch 212 permits a positive gating voltage pulse, through resistor 214, which may have a resistance of approximately 5,600 ohms, to be applied through gate element 216 to the gating rectifier 200, thereby triggering the latter into conductive condition. The DC voltage at supply terminals 197, 198 is accordingly now made available at terminals 217 and 218. Disregarding the negligible forward resistance of diode 204, this voltage, minus the voltage drop across resistor 205, is therefore impressed across the winding 206 of the magnetic clutch 49. The electrical values in the circuit are so chosen that the voltage across winding 206 of the magnetic clutch under these conditions is substantially equal to the rated voltage for the clutch. Thus, exemplarily, the DC voltage available at the output terminals 197, 198 of DC power supply 190 may be assumed to be in the neighborhood of 150 volts. A typical magnetic clutch 49 suitable for use in the present invention may have a rated voltage of 90 volts, and include a winding 206 having a resistance of approximately 1,150 ohms. Under these conditions, and allowing for a few volts drop in the gated rectifier 200 and the diode 204, the resistance of resistor 205 may be approximately 600 ohms.

Means are desirably provided in accordance with the invention for supplying a retarding, snubbing or damping voltage to the winding 206 of the clutch 49. The maximum value of such damping voltage is selectively adjustable in the present embodiment of the invention, and may be assumed to be approximately 15 volts, that is, approximately one-sixth of the clutch rated operating voltage, previously assumed to be 90 volts. The means for supplying the retarding voltage to the clutch winding 206 in the present illustrative circuitry includes the voltage divider 202 heretofore mentioned, comprising resistor 221, adjustable resistor 222 and resistor 223, the three resistors being connected in series as shown between points 217, 218. It will be seen that the slider 226 of the adjustable resistor 222 serves to pick off and apply through diode 228 a desired charging voltage at points 229, 230 across capacitor 231.

In order to provide the desired voltage across capacitor 231, resistor 221 may have a resistance of 600 ohms; resistor 222 may have a resistance of 100 ohms; and resistor 223 may have a resistance of 50 ohms. It will thus be seen that the voltage between point 218 and slider 226 may be adjusted to be from about one-tenth to about one-fifth of the total available voltage between points 217 and 218. It will be noted that, so long as the voltage across clutch winding 206 is greater than the voltage across capacitor 231, the capacitor is effectively isolated from such higher voltage by reason of diode 235 between the positive terminals 229 and 236 of capacitor 231 and winding 206 respectively.

It will be recalled that the normally closed switch 85 is actuated into open position at a predetermined point in the lower portion of the downward stroke of the reciprocable compression beam 41. Opening of switch 85 quenches gated rectifier 200 and removes the rated 90 volts from the winding 206 of the magnetic clutch, and the voltage across that winding thereupon falls very rapidly to the voltage of capacitor 231. Moreover, as will be readily understood, the voltage of capacitor 231 will immediately commence the typical logarithmic decay at a rate determined by the capacitance of capacitor 231 and the resistance of winding 206, it being assumed that the forward resistance of diode 235 is negligible for present purposes.

At and immediately following the instant when normally closed switch 85 is opened, the movement of beam 41 of the present device, both as to direction and speed, will be determined by the interrelationship of upwardly and downwardly directed forces applied to the beam. The downward directed forces include the momentum of the moving parts, principally the reciprocable beam 41, and the decaying force supplied to those parts through the magnetic clutch 49. The upwardly directed forces include that of the restoring spring 54, plus the resilience of the patient's body, more particularly the force from within his body tending to restore the downwardly deflected sternum and rib cage to their unstressed condition.

Within a short period after switch 85 is opened, the resultant of the forces just mentioned causes the beam 41 to reverse its downward direction of movement and commence moving upwardly. If too rapid, the upward movement of the beam may be undesirable physiologically, as well as possible damaging to the machine itself, particularly as the beam approaches and reaches the upper limit of its travel. It has been found that the force tending to retard upward movement of the beam resulting from the decaying torque transmitted by magnetic clutch 49 can be made to properly balance the upwardly directed forces involved, so that no physiological harm to the patient or possible damage to the machine results.

Means may be provided in accordance with the present invention for effectively very substantially increasing the rate of decay of the voltage across clutch winding 206 supplied by capacitor 231 and thus to more rapidly remove the effect of torque transmitted by the clutch to the moving parts. This may be desirable, for example, when the machine of the present invention is operated for testing or demonstration purposes without a patient's chest positioned under the beam 41. It may also be applicable when the machine is used to revive a patient whose sternum exhibits a comparatively low restorative force after being depressed by the downward stroke of the beam.

Under either of these conditions, there may be a tendency for the beam to travel too far downwardly, which might cause physiological harm to the patient or, when used in demonstrations without a patient, such excessive downward travel might damage the machine by reason of the mechanical shock resulting if the beam collar 63 strikes the housing 48 with substantial speed.

The foregoing objectionable operating characteristics can be avoided by the provision of means for much more rapidly discharging capacitor 231, thereby to remove the effect of torque transmitted by the magnetic clutch to the reciprocable member 41. More specifically, the normally open switch previously mentioned and indicated generally at 95 is connected in series with the resistor 240 across capacitor 231. It will be recalled that switch 95 is actuated to closed position in the event that the beam moves downwardly substantially beyond the point at which the downward movement of the beam 41 opens the normally closed switch 85.

Closing of switch 95 serves to provide another path, in addition to the winding 206 of clutch 49, for the discharge of capacitor 231, and thereby to more rapidly deenergize the magnetic clutch 49. In a typical installation in accordance with the present invention where the capacitance of capacitor 231 is 150 m.f.d., the resistance of resistor 240 may be approximately 560. ohms, or approximately half the typical resistance of 1,150 ohms assumed for clutch winding 206.

OPERATION OF THE CARDIOPULMONARY APPARATUS

Operation of the cardiopulmonary device may now be described. The apparatus 20, being completely portable, may be carried to the location of a patient who has experienced heart arrest. The case of the apparatus is then opened so that the rear and forward sections 22 and 23 are lying flat and generally coplanar with base 21, and the frame 24 is removed from the base by unlatching clips 29. The lower portion of the case is then slid beneath the patient so that the patient's neck lies above neck rest 37. The respirator mask 35 is then placed over the patient's mouth and secured thereto by means of straps 38. The upper portion or frame 24 of the case may then be positioned with respect to the patient by attaching clips 29. The frame must be carefully positioned longitudinally relative to the patient so that the pressure foot pad 61 is positioned directly above the lower one-third of the patient's sternum. The foot pad is then adjusted vertically by moving adjustment bar 60 within compression beam 41 by removing adjustment pin 68 and allowing the bar 60 and foot pad 61 to rest upon or be held above the patient's chest. Adjustment pin 68 is then repositioned through one of the lateral openings 71 in the bar 60 so as to connect the bar 60 and foot pad 61 to the reciprocable compression beam 41.

The device may be used by connection to a source of alternating current power, such as in a building, or may also be connected to a source of direct current power such as if used in an ambulance or other vehicle, with appropriate electrical changes as will be obvious. When properly connected and positioned with respect to the patient, the device may be operated to provide the cardiopulmonary resuscitation.

Turning first to the operation of the cardiac resuscitation apparatus, energizing of the cardiac motor 40 supplies mechanical power through output shaft 46 into gear reducer 47. Power is simultaneously supplied to timing motor 180 to drive cam 210 and thus to close switch 212, thereby triggering silicon-controlled rectifier 200 so that the rated voltage of the clutch 49 is impressed thereupon. With clutch 49 fully engaged, power is transmitted through gear reducer 47 to gear 51 and through gear 52 to shaft 53 and pinion 57 engaging gear rack 59 thereby driving compression beam 41 downwardly.

As beam 41 progresses in its downstroke, the trip arm 65 moves downwardly a distance preferably of 1 ¾ inches, or less than 1 ½ inches, and then contacts cap 83 of plunger rod 82. Plunger rod 82 is moved downwardly so that cylindrical cam 89 engages contact roller 87 forcing contact arm 86 of switch 85 inwardly so as to instantly open normally closed switch 85. Opening of switch 85 removes the rated voltage from the winding of the magnetic clutch 49 and the voltage across the winding falls rapidly to the voltage of capacitor 231. It will be recalled that subsequent to the triggering of silicon-controlled rectifier 200, voltage will be impressed upon capacitor 231 charging it to exemplarily 15 volts. The momentum of the compression rod and other moving parts of the mechanical system will cause the compression beam to proceed further in its downward stroke. The distance greater than the predetermined limit distance, as established by the position of switch 85, will be determined by the forces acting upon the compression beam 41. These forces, as previously noted, include principally the momentum of the beam acting downwardly and the reduced driving force of the power means through the partially engaged magnetic clutch and the restorative force of the patient's sternum acting upwardly. Obviously, the downward travel of the compression beam will be reversed when the upward force of the patient's sternum overcomes the momentum of the beam.

The compression beam then commences its upward stroke. The speed of the upward stroke of the compression beam 41 will be determined by the restorative force of the patient's sternum, but will also be controlled by the continuing downward driving engagement between the pinion 57 and the compression beam gear rack 59 since some torque is transmitted through partially engaged clutch 49. The amount of force transmitted through the clutch will be dependent upon the voltage supplied by capacitor 231. However, it will be understood that the capacitor voltage decays rapidly and thus the clutch 49 continually transmits a lesser amount of torque. When the compression beam 41 has moved upwardly to a distance whereby trip arm 65 releases cap 83 of plunger rod 82, switch 85 will be reclosed. At a point subsequent to the reclosing of switch 85 the timing motor 180 through rotation of cam 210 and closure of switch 212 will again trigger the gated rectifier 200. Thus, rated voltage will again be impressed upon clutch 49 so that it transmits maximum torque and thus drives the beam downwardly. This completes one cycle of the compression beam 41.

As pointed out above, if the sternum of the patient (such as an adolescent patient) does not provide sufficient restorative force, the compression beam in its downward stroke will continue to a point which may be physiologically damaging to the patient. However, there is provided the second switch 95, which upon travel of the compression beam further downwardly, will cause the rectangular cam 99 on plunger rod 82 to contact wheel 96 thereby depressing resilient contact arm 97 of switch 95 so as to close that normally open switch. Closing of switch 95 very quickly relieves the voltage across capacitor 231 and therefore across winding 206 of magnetic clutch 49 so that virtually no further power is transmitted through the clutch to the compression beam 41. The relatively small restorative force of the patient's sternum will then overcome the momentum of the compression beam 41 reversing its direction.

The last-described operation of the apparatus is also applicable to use of the apparatus in the absence of a patient such as when the device is being tested in the field to assure its continued proper operation. In this situation, it has been found, that the compression beam collar 63 may strike the housing 48 with sufficient force so as to damage the gear train of the device, particularly pinion gear 57. The upward movement of the compression beam in the absence of a patient, of course, will be provided by the resilient force produced by the spiral spring 54 which overcomes the momentum of beam 41 when no torque is transmitted through clutch 49.

Turning now to the operation of the respirating means, it will be noted that upon each downstroke of the compression beam 41, the pawl 132 on the subsequent upstroke will cause the ratchet wheel 127 to index a distance, in the illustrated embodiment, corresponding to one-tenth of one revolution. After five strokes of the compression beam 41, and therefore after five pumping actions of the patient's heart, the contact projection 130 on hub 129 attached to ratchet wheel 127 will depress the contact arm 126 so as to close switch 125. The momentary closure of switch 125 (since on the subsequent stroke of the compression rod the switch 125 will be opened) will momentarily energize the respiration motor 30 so as to rotate crank 108 and thereby begin arcuate movement of actuating arm 115.

Slight movement of arm 115 causes the rearward end portion 165 thereof (see FIG. 11) to close the switch 135 so as to provide continuing current to the respirator motor 30 after switch 125 is opened. Switch 135 will remain closed until actuating arm 115 has caused bellows 32 to be completely depressed and then expanded at which time arm 115 and the cam portion 165 thereof permits switch 135 to reopen. The actuation of the bellows 32 will supply air for lung ventilation of the patient.

It will now be understood that the lung ventilation occurs in a ratio of one to five with the compression and consequent perfusion of the patient's heart. Thus, lung ventilation is provided without any interruption of the cardiac resuscitation, thereby avoiding the critical drop of blood flow and blood pressure when compression is even momentarily interrupted.

It will be seen from the above description of the device and its operation that the present invention provides a cardiopulmonary resuscitation apparatus which accomplishes the previously pointed out objects. Through the positive interconnection between the power means or drive motor and the reciprocable compression beam, there is provided a downward compression stroke which is only slightly less than the recommended minimum distance of depression of 1½ inches. Since the remainder of the downward stroke of the pressure foot pad will be determined by the patient's body condition, there is little if any possibility of physiological damage to the patient. Moreover, in the event that the patient's body condition allows the downward stroke of the compression beam to approach the maximum recommended distance of 2 inches, there is provided further means to limit the momentum portion of the downward stroke. Finally, it will be appreciated that the above-described device will not require any monitoring and control by an operator of the deflection of the patient's sternum and is responsive to the patient's body condition only after a predetermined minimum depression of the body is accomplished through positive drive interconnection.

In summary as to the electrical control circuitry of the invention, it will be understood that it is assumed that the amount of torque transmitted by the interconnecting means or clutch 49 will be generally proportional to the value of the input signal impressed thereon, relative to the maximum or rated value of the input signal corresponding to zero slip. It will further be seen that the value of the input signal to the clutch is maintained at said rated value during the major portion of the downward stroke of the beam or rod. At the instant when the beam arrives at the first predetermined point, opening of normally closed switch 85 causes the value of the input signal to the clutch to decrease very rapidly to a value heretofore referred to as snubbing, retarding or damping value. Moreover, by reason of the RC circuit including capacitor 231 and magnetic clutch winding 206, the input signal will decay approximately in accordance with the well-known logarithmic relationship in a time constant circuit, modified slightly by the effect of the inductance of clutch winding 206. Furthermore, if the beam continues downwardly as far as the second predetermined point, spaced below the first point, arrival of the beam there closes normally open switch 95, thus shunting the clutch winding by resistor 240 and thereby more rapidly decreasing the value of the input signal to the magnetic clutch winding. Effectively, following such actuation of normally open switch 95 to its closed position, the input signal is decreased virtually instantaneously to such a small value as to cause no sensible amount of torque to be transmitted by the magnetic clutch to the beam.

Although the damping signal has been referred to as having an exemplary value of about one-sixth of the rated input signal, nevertheless it is to be understood that the damping signal may vary substantially from such exemplary value, depending upon mechanical and electrical parameters and other design factors. In fact under some operating conditions, the damping signal may be virtually zero, or even eliminated if not required by reason of the spring rate and other constants of a particular machine.

Obviously, many modifications and variations of the present invention are possible in the light of the above teachings. It is therefore to be understood that within the scope of the appended claims, the invention may be practiced otherwise than as specifically described.

I claim:

1. In an electrically controlled machine for cyclically moving a member having inertia through a substantially constant distance between a rest position and an extended position, the member being subjected to a varying force biasing the member toward rest position, the machine including:

restorative means for furnishing a portion of the said varying force, a source of power adapted to drive the member toward its extended position, means responsive to an input signal and interconnecting the power source and the member for transmitting to the member a portion of the output of the power source generally proportional to the value of the input signal, the provision of means controlling the value of the input signal including:

means cyclically initiating and continuing to apply a driving input signal of constant maximum value to the interconnecting means; and means actuated by the arrival of the member at a predetermined point in its movement toward its extended position for decreasing said input signal to a value insufficient to cause the interconnection means to transmit sufficient force to the member to overcome the force of the restorative means.

2. The invention as defined in claim 1 wherein said means actuated by the arrival of the member at the predetermined point includes means for removing said driving input signal and substituting therefor a damping signal whose value is lower than that causing the interconnecting means to supply force to the member sufficient to overcome the force of the restorative means.

3. The invention as defined in claim 2 including means causing said damping signal to decay in value with time.

4. The invention as stated in claim 3 wherein said decay causing means includes an RC circuit.

5. The invention as defined in claim 2 including means actuated by the arrival of the member at a second predetermined point, more distant from the rest position than the first predetermined point, for rapidly decreasing the value of the damping signal.

* * * * *